UNITED STATES PATENT OFFICE.

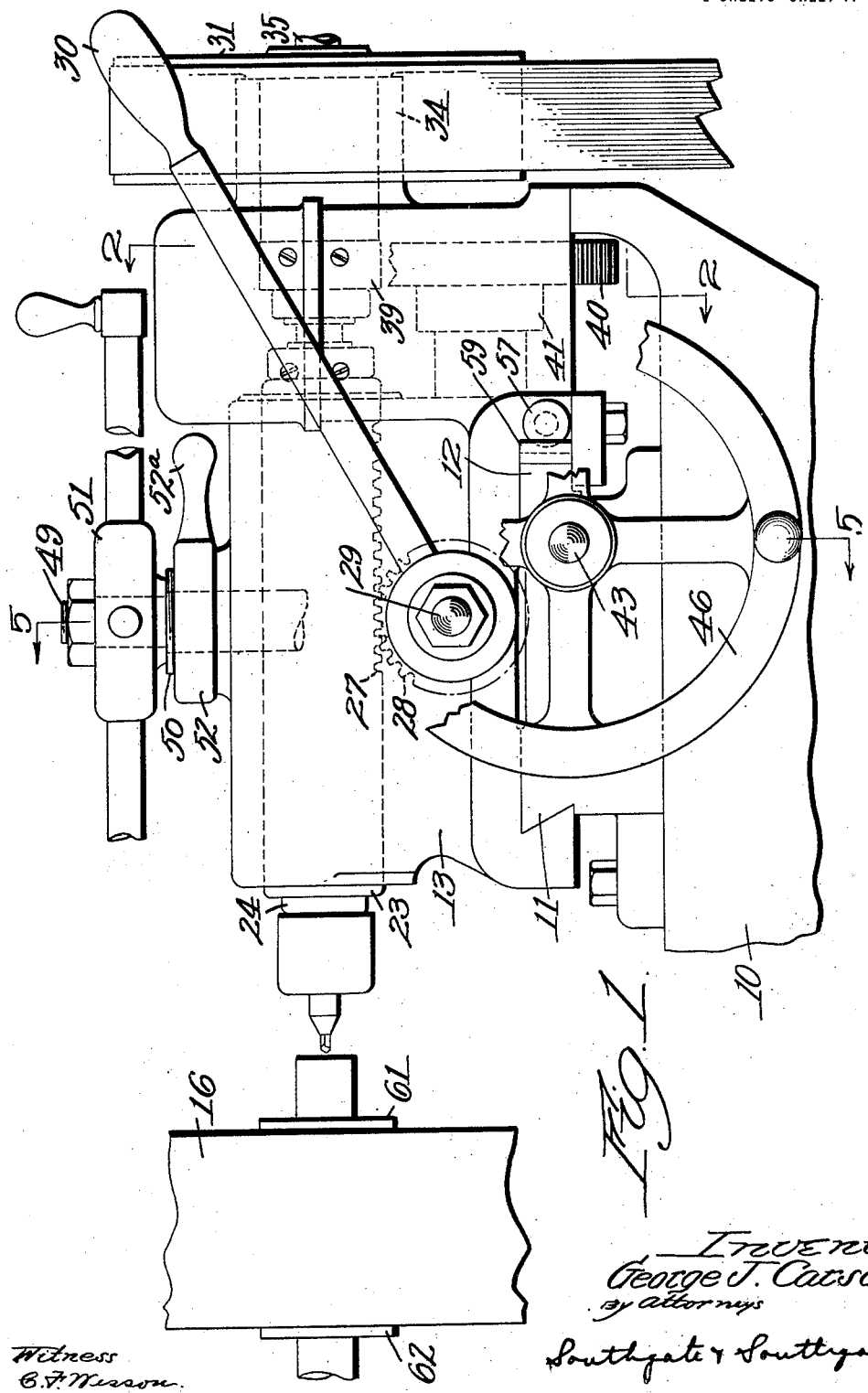

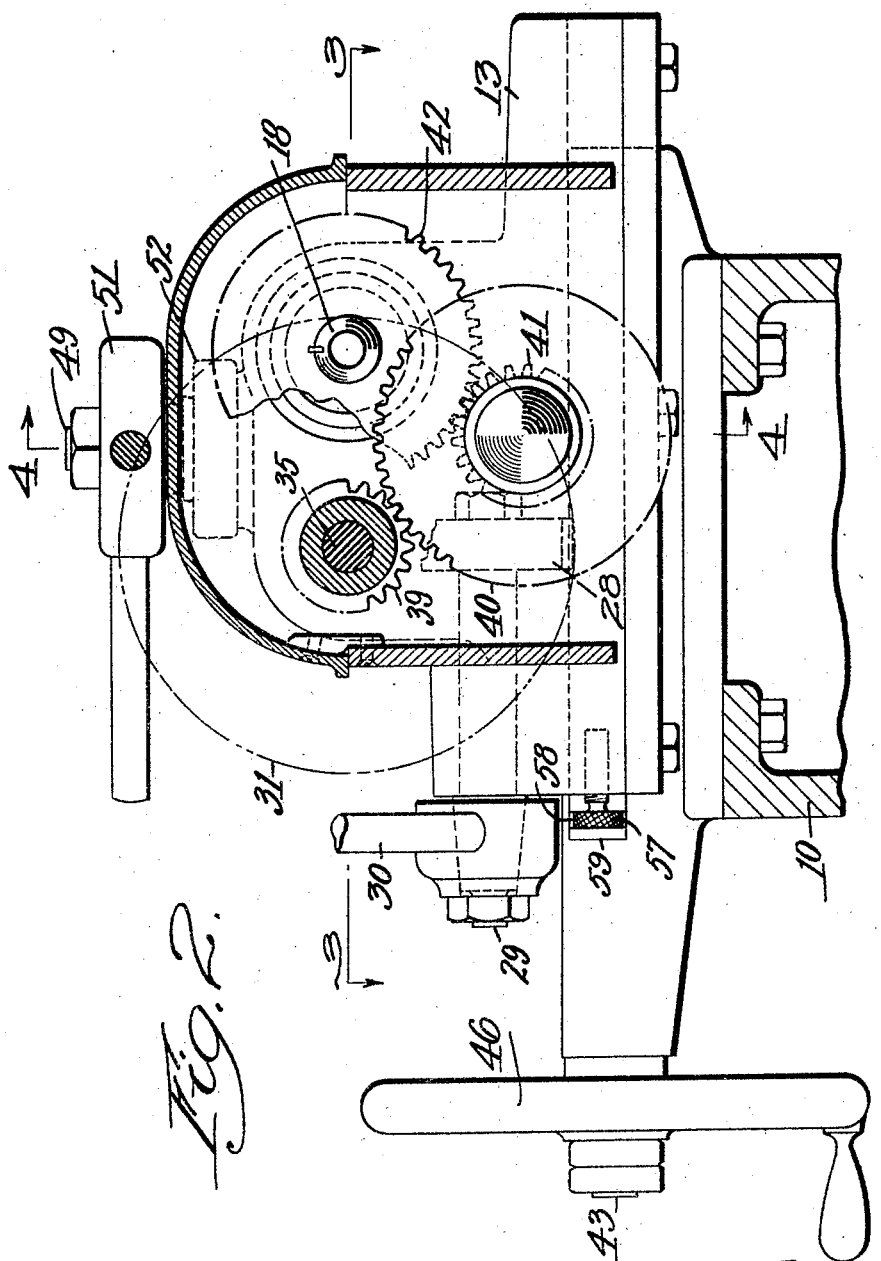

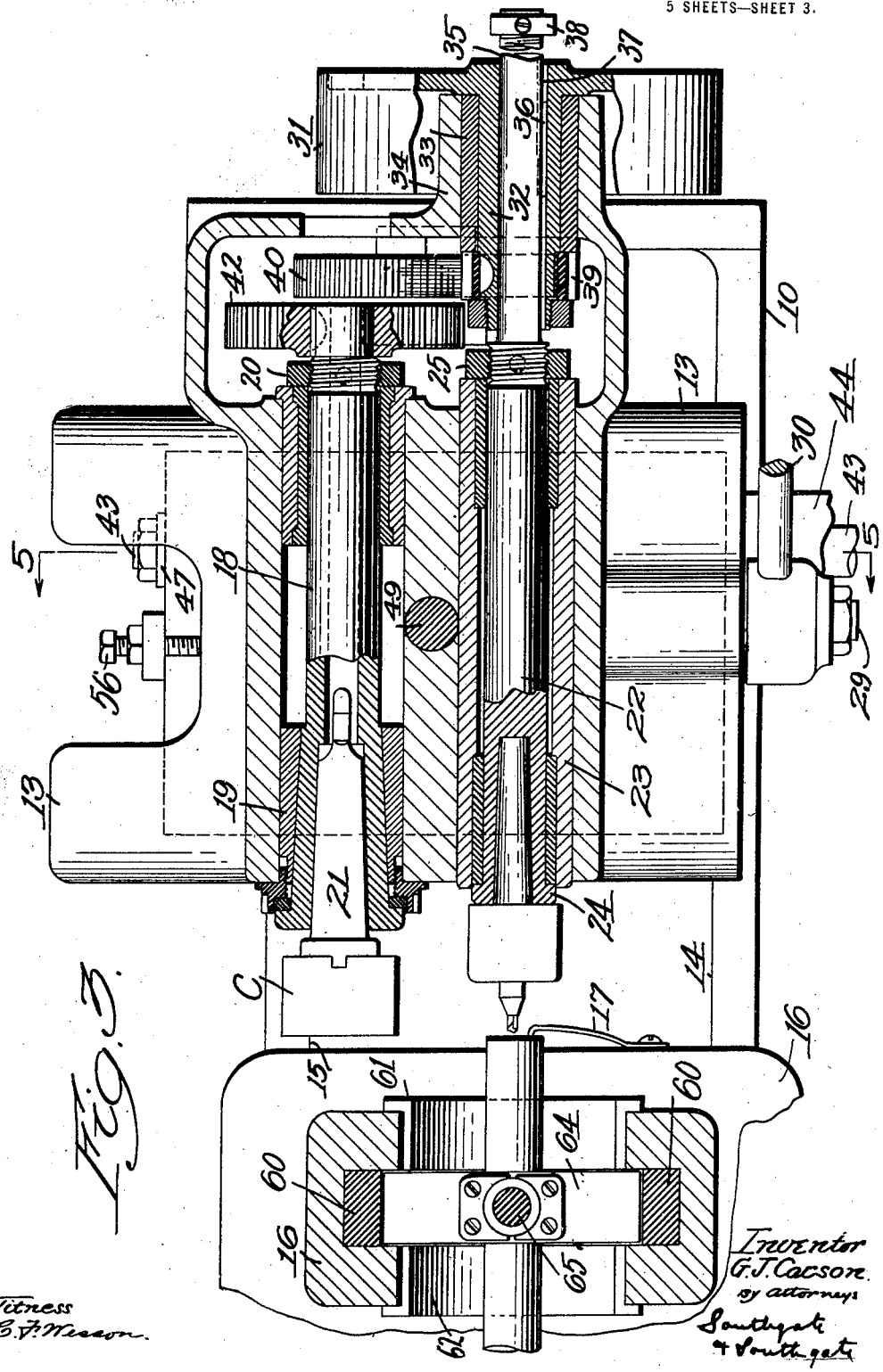

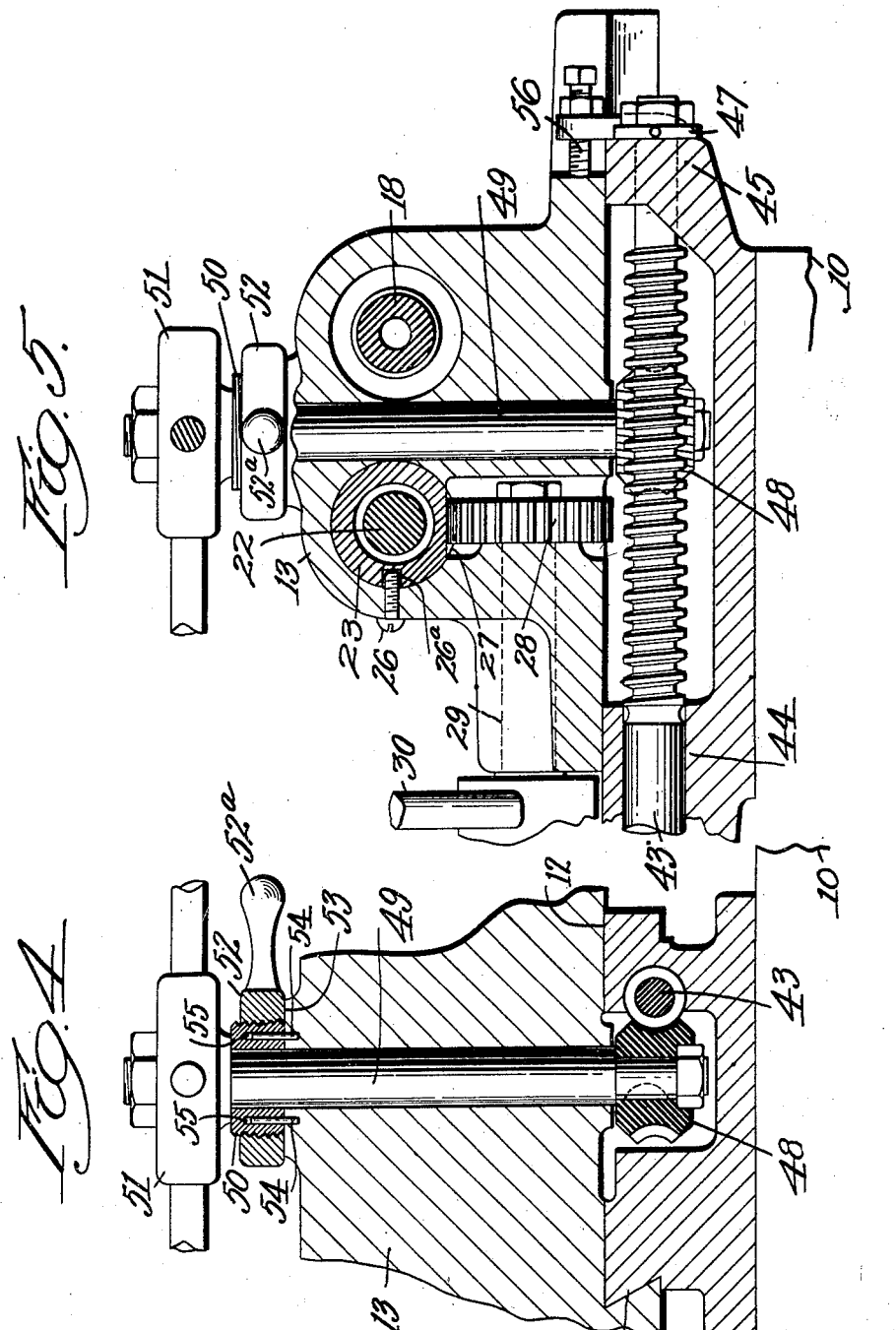

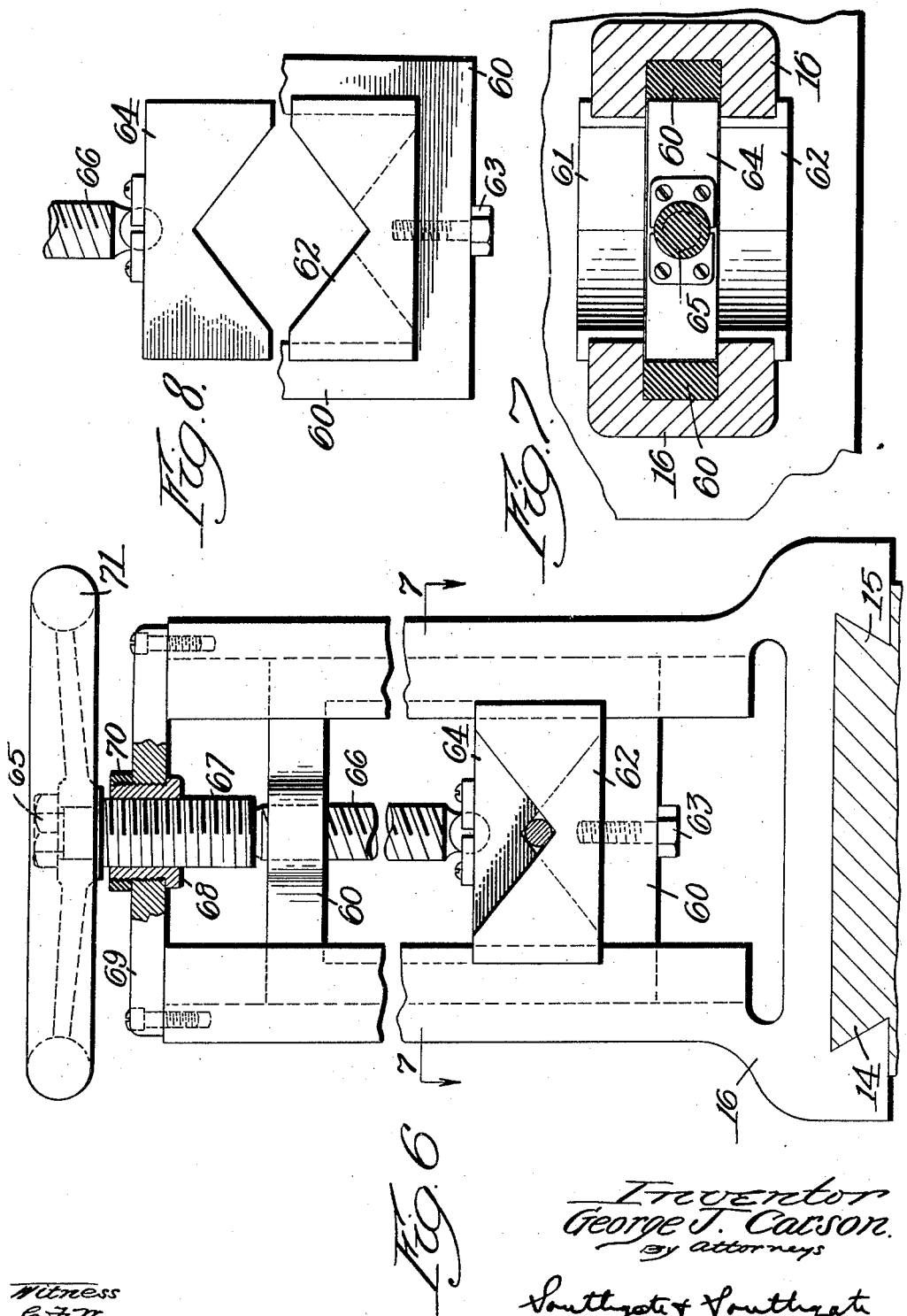

GEORGE J. CARSON, OF WORCESTER, MASSACHUSETTS.

CENTERING-MACHINE.

1,375,896.  Specification of Letters Patent.  Patented Apr. 26, 1921.

Application filed April 9, 1919. Serial No. 288,673.

*To all whom it may concern:*

Be it known that I, GEORGE J. CARSON, a citizen of the United States, residing at Worcester, in the county of Worcester and State of Massachusetts, have invented a new and useful Centering-Machine, of which the following is a specification.

This invention relates to a machine for preparing stock for use in lathes, or similar machines in which it is rotated upon centers.

It is customary to drill and countersink such stock and to thereafter square off the ends with a side finishing tool, an operation involving considerable time and expense when many times repeated. Furthermore it is impossible by this method to secure center holes having the countersunk position of the same diameter and depth, as the size and depth will vary with the amount removed in squaring off the end after the hole is made. This variation in size causes variation in the axial position of the pieces when placed in the lathe or other machine, thus preventing the use of fixed stops on the machine in making duplicate parts.

It is the general object of my invention to provide a machine in which the parts may be squared off first, and thereafter centered, and by which the center holes in a plurality of pieces may all be formed of the same size.

With this general object in view, one feature of my invention relates to a construction in which a milling cutter and a countersink drill may be caused to operate successively upon a piece of stock firmly held in the machine.

In the preferred form of my invention, the milling cutter and drill are mounted in a cross head, and another feature of my invention relates to the provision of means for feeding the cross head slowly, as when making the milling cut, and for also feeding the cross head rapidly as when moving the drill spindle to operative position.

Other features of my invention relate to an improved device for holding the stock while the milling and centering operations are being performed, and to improved driving mechanism for the milling and drill spindles.

My invention further relates to arrangements and combinations of parts which will be hereinafter described and more particularly pointed out in the appended claims.

A preferred form of my invention is shown in the drawings, in which

Figure 1 is a side elevation of the head portion of my improved centering machine;

Fig. 2 is a sectional end elevation taken along the line 2—2 in Fig. 1;

Fig. 3 is a sectional plan view taken along the line 3—3 in Fig. 2, but including certain parts not shown in Fig. 2;

Fig. 4 is a partial longitudinal sectional elevation taken along the line 4—4 of Fig. 2;

Fig. 5 is a transverse sectional elevation taken along the line 5—5 of Fig. 1;

Fig. 6 is a front elevation, partly in section, of the stock holding device;

Fig. 7 is a sectional plan view of said device taken along the line 7—7 of Fig. 6, and Fig. 8 is a detail front elevation of certain of the parts of said device, shown in a different position.

Referring to the drawings, my improved centering machine comprises a base or frame 10 having ways 11 and 12 (Fig. 1) for a cross head 13, and ways 14 and 15 (Figs. 3 and 6) for a stock holding device 16. The latter device is designed for centering different pieces of stock in the same lateral position, and may also be provided with a swing stop 17 for accurately positioning the parts endwise. The detailed construction of the stock holding device will be hereinafter described.

A milling spindle 18 (Fig. 3) is rotatably mounted in bearings in the cross head 13, but is held from longitudinal movement by a cone bearing 19 at one end and by a set collar 20 at the opposite end. Any suitable end mill or other milling cutter C may be mounted on a shank 21 in the spindle 18 or in any other convenient manner.

A drill spindle 22 (Fig. 3) is rotatably mounted in bearings in a sleeve 23 and is prevented from longitudinal movement relative to said sleeve by a flange 24 at one end of the spindle and by a set collar 25 at the opposite end. The sleeve 23 is slidable longitudinally in the cross head 13 but is prevented from rotation therein by a screw stud 26 (Fig. 5) projecting into a key-way 26ᵃ, or by other suitable means. The sleeve 23 is provided with rack teeth 27 (Fig. 1) engaged by a spur gear 28 fast on a short shaft 29 having a handle 30 secured to its outer end, by which the sleeve and spindle may be moved axially toward and from the work while the drill is driven at cutting speed.

The driving pulley 31 is provided with an extended hub 32 rotatable in a bearing 33 fixed in a cross head extension 34 (Fig. 3). The drill spindle 22 is provided with an extension 35 slidable in the hub 32 and having a key 36 fitting a key-way 37 in the hub. A collar 38 is threaded to the end of the extension 35 and may be adjusted to form a stop for the drill spindle, when engaged by the outer end of the pulley hub.

A pinion 39 is keyed and otherwise secured to the inner end of the hub 32 and engages a gear 40 (Fig. 2) rotatable on a bearing fixed in the cross head 13. A pinion 41 is secured to the gear 40 and engages a gear 42 fast on the milling spindle 18.

With this construction the drill will be rotated directly by the driving pulley 31 and the milling cutter will be driven at reduced speed therefrom.

I will now describe the cross feeding mechanism for the head 13. A feed screw 43 (Fig. 5) is mounted in bearings 44 and 45 in the frame 10, and is prevented from longitudinal movement in said bearings by a hand wheel 46 secured to one end of the feed screw, and by a collar 47 fixed to the opposite end, said hand wheel and collar engaging suitable surfaces on the bearings.

The feed screw 43 meshes with a worm wheel 48, (Fig. 4) fixed to the lower end of a vertical shaft 49 rotatable in a bearing in the head 13. At its upper end the shaft 49 extends freely through a threaded collar 50 and is provided with a hand wheel 51 by which it may be rotated. A threaded sleeve 52 surrounds the collar 50 and engages a shoulder 53 on the head 13. A handle 52ª constitutes means by which the collar 52 may be turned. Pins 54 in the head 13 extend into holes 55 in the collar 50, and permit the collar to move axially but not angularly.

The shaft 49 is normally freely rotatable in the head 13 and the worm wheel 48 may be rotated by the hand wheel 51 to move the cross head quickly along ways 11 and 12, the feed screw 43 acting as a rack for the gear 48. When a slow milling feed is desired, the sleeve 52 is turned to force the collar 50 outwardly, thus binding the worm wheel 48 against the lower face of the head 13 and preventing rotation thereof. The worm wheel thereafter serves as a nut for the feed screw 43 which may be rotated by the hand wheel 46 and will thus effect a slow cross feed of the head 13. Thus by a simple angular movement of the sleeve 52 I can avail myself of either fast or slow cross feed, the fast feed being commonly used for shifting the head so as to bring a different spindle into working position, and the slow feed for the milling cut. An adjustable stop 56 (Fig. 3) is provided for limiting the transverse movement of the cross head so that the drill spindle may be axially alined with the stock for the drilling operation.

The head of a screw 57 (Fig. 2) threaded in the cross head 13 is received in a notch 58 formed in the side of the taper gib 59 and constitutes means by which the ways for the cross head may be adjusted.

The stock holding device shown in Figs. 6 to 8 comprises a frame 16 adjustable longitudinally along ways 14 and 15 formed on the frame 10. A slide 60 is mounted within the frame 16 and supports a pair of lower jaws 61 and 62, which may be secured therein by a screw 63. An upper jaw 64 is swiveled to the end of a feed screw 65 having a portion 66 threaded in the upper part of the slide 60, and having a second portion 67 threaded in a nut 68 which in turn is threaded into the upper cross piece 69 of the frame 16, and is secured therein by a lock nut 70.

The thread 66 is double the pitch of the thread 67 and consequently, upon rotation of the feed screw by means of the hand wheel 71, the jaws 63 and 64 are moved equally in opposite directions, thus maintaining the jaws centered for all sizes of stock. The jaws as a unit may be slightly adjusted vertically for alinement with the drill spindle by means of the threaded collar 68 and lock nut 70.

Having thus described my invention, it is thought that the operation thereof will be clearly apparent. The stock is first clamped in the stock holding device 16 after which the milling cutter is moved transversely of the stock to square off the end thereof, preferably using the slow cross feed, and the cross head is then quickly shifted by means of the fast cross feed to bring the drill spindle into alinement with the stock. The drill spindle is then advanced by the handle 30 to drill and countersink the stock, the depth of the countersink being dependent on the position of the collar 38.

Having thus described my invention, it will be evident that changes and modifications can be made therein by those skilled in the art, without departing from the spirit and scope thereof as set forth in the claims, and I do not wish to be otherwise limited to the details therein disclosed, but what I claim is:—

1. A centering machine comprising means to hold the stock, a cross head, a pair of spindles rotatably mounted in substantially parallel relation in said cross head, mechanical means to feed the cross head transversely of the stock, and mechanical means to feed one spindle longitudinally of the stock.

2. A centering machine comprising a milling cutter, a drill, spindles for said cutter and drill, a cross head in which said spindles are mounted, means to drive said spindles at different relative speeds, means to effect relative longitudinal feed between the stock and said drill, and means to feed said cross head slowly and positively transversely to effect the milling operation.

3. A centering machine comprising means to hold the stock, a cross head, a pair of spindles rotatably mounted in said cross head, means to drive said spindles, means to feed said cross head relatively slowly, and means to feed said cross head relatively rapidly.

4. A centering machine comprising means to hold the stock, a cross head, a pair of spindles rotatably mounted in said cross head, separately operated manual devices for moving said cross head slowly and rapidly, and a single means to render either device operative and the other device inoperative.

5. A centering machine comprising means to hold the stock, a cross head, a pair of spindles rotatably mounted in said cross head, and feeding means for the cross head comprising a feed screw, a worm wheel engaged therewith, and separate manually operable devices for rotating said feed screw and said worm wheel whereby relatively fast and relatively slow cross feed may be attained.

6. A centering machine comprising means to hold the stock, a cross head, a pair of spindles rotatably mounted in said cross head, and feeding means for said cross head comprising a feed screw, a worm wheel engaged therewith, separate manually operable devices for rotating said feed screw and said worm wheel, and means to hold said worm wheel from rotation.

7. A centering machine comprising means to hold the stock, a cross head, a pair of spindles rotatably mounted in said cross head, a feed screw rotatable in fixed bearings, a vertical shaft rotatably mounted in said cross head and capable of slight axial movement, a worm wheel on said shaft, means to rotate said shaft manually, and normal means to permit or prevent rotation of said shaft at the will of the operator.

In testimony whereof I have hereunto affixed my signature.

GEORGE J. CARSON.